United States Patent
Gruber et al.

(10) Patent No.: US 9,194,448 B2
(45) Date of Patent: Nov. 24, 2015

(54) DISC BRAKE FOR A COMMERCIAL VEHICLE

(71) Applicant: KNORR-BREMSE Systeme fuer Nutzfahrzeuge GmbH, Munich (DE)

(72) Inventors: Markus Gruber, Ebersberg (DE); Ralf Weber, Munich (DE); Matthias Klingner, Moorenweis (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 84 days.

(21) Appl. No.: 14/194,231

(22) Filed: Feb. 28, 2014

(65) Prior Publication Data

US 2014/0174862 A1  Jun. 26, 2014

Related U.S. Application Data

(63) Continuation of application No. PCT/EP2012/065853, filed on Aug. 14, 2012.

(30) Foreign Application Priority Data

Sep. 2, 2011 (DE) .......................... 10 2011 112 360

(51) Int. Cl.
*F16D 65/56* (2006.01)
*F16D 55/226* (2006.01)
(Continued)

(52) U.S. Cl.
CPC ............... *F16D 65/567* (2013.01); *B60T 1/065* (2013.01); *F16D 55/226* (2013.01); *F16D 65/183* (2013.01); *F16D 65/568* (2013.01); *F16D 2121/14* (2013.01)

(58) Field of Classification Search
CPC . F16D 65/567; F16D 65/568; F16D 2125/28; F16D 2125/32
See application file for complete search history.

(56) References Cited

U.S. PATENT DOCUMENTS

| | | | | |
|---|---|---|---|---|
| 4,502,572 A | * | 3/1985 | Davidson et al. | 188/72.8 |
| 6,269,914 B1 | * | 8/2001 | Angerfors | 188/71.9 |
| 6,923,297 B1 | * | 8/2005 | Thomas et al. | 188/72.8 |

FOREIGN PATENT DOCUMENTS

| | | |
|---|---|---|
| DE | 40 20 189 A1 | 1/1992 |
| DE | 94 22342 U1 | 5/2000 |

(Continued)

OTHER PUBLICATIONS

International Preliminary Report on Patentability (PCT/IB/326 & PCT/IB/373), including Written Opinion (PCT/ISA/237) dated Mar. 13, 2014 (Six (6) pages).

(Continued)

*Primary Examiner* — Bradley King
(74) *Attorney, Agent, or Firm* — Crowell & Moring LLP

(57) ABSTRACT

A disc brake for a commercial vehicle includes a brake caliper which extends over a brake disc, a brake application device which is arranged in the brake caliper for pressing brake pads against the brake disc, and at least one adjustment spindle which is rotatably mounted in a bridge via a threaded coupling. A wear adjusting device is positioned in the brake caliper by which a wear-induced change of the clearance between the brake pad and the brake disc can be substantially compensated for via an axial movement of the adjusting spindle. The disc brake is designed such that the adjusting spindle has at least one axial groove on an outer side, the length of the groove being limited in the direction of the brake application device. A stop, which is axially fixed relative to the bridge, engages into the axial groove in a relatively displaceable manner.

10 Claims, 2 Drawing Sheets

(51) Int. Cl.
  *F16D 65/18* (2006.01)
  *B60T 1/06* (2006.01)
  *F16D 121/14* (2012.01)

(56) References Cited

FOREIGN PATENT DOCUMENTS

| DE | 10 2011 110 055 A1 | 2/2013 |
| EP | 0 852 301 A1 | 7/1998 |
| EP | 2 557 331 A1 | 2/2013 |
| EP | 2 557 331 B1 | 4/2014 |
| WO | WO 97/01044 A1 | 1/1997 |

OTHER PUBLICATIONS

International Search Report (PCT/ISA/210) dated Nov. 16, 2012 (Five (5) pages).
European Office Action dated May 19, 2015 (four pages).
German Office Action dated May 13, 2014 (six pages).

* cited by examiner

DISC BRAKE FOR A COMMERCIAL VEHICLE

CROSS REFERENCE TO RELATED APPLICATIONS

This application is a continuation of PCT International Application No. PCT/EP2012/065853, filed Aug. 14, 2012, which claims priority under 35 U.S.C. §119 from German Patent Application No. 10 2011 112 360.5, filed Sep. 2, 2011, the entire disclosures of which are herein expressly incorporated by reference.

BACKGROUND AND SUMMARY OF THE INVENTION

The invention relates to a disc brake for a commercial vehicle having a brake caliper which engages over a brake disc, a brake-application device which is arranged in the brake caliper and which serves for pressing brake pads against the brake disc, and at least one adjustment spindle which is rotatably mounted, by way of a corresponding thread, in a bridge of the brake-application device.

In the case of a generic disc brake such as is known, for example, from DE 94 22 342 U1, a brake lever acts on a bridge which is positioned in a brake caliper and in which there are mounted two adjustment spindles, which have in each case one thrust piece for the mounting of a brake pad composed of a lining carrier plate and of a friction lining fastened thereto. The brake pad is pressed against a brake disc during a braking operation. The two adjustment spindles are provided with an external thread and are screwed in each case into a threaded bore of the bridge.

In the event of wear of the friction lining, a wear adjustment device assigned to one of the adjustment spindles serves, by rotating said adjustment spindle, to advance the brake pad in the direction of the brake disc such that an air gap between the brake pad and the brake disc is always kept substantially constant.

For safety reasons, the friction lining should not fall below a minimum thickness, wherein a so-called wear sensor is embedded, in effect as an alarm sensor, in the friction lining. A corresponding signal is triggered when the wear sensor comes into contact with the brake disc. Here, the wear sensor is positioned such that a minimum friction lining thickness remains.

In practice, however, problems often arise in that such signals are disregarded and the vehicle continues to be used, such that the friction lining becomes worn beyond the maximum admissible extent.

For design reasons, the adjustment spindles, which are guided in the bridge and which are axially adjustable relative thereto, are limited in terms of their length, such that in the event of a further advancing movement, the adjustment spindles are screwed out to such an extent as to become disconnected from the bridge. Thus, the adjustment spindles can no longer perform the actual braking function, specifically the transmission of the braking force to the brake pad, which ultimately leads to a total failure of the disc brake.

The stated problems arise not only in the event of alarm signals being ignored but also in the event of failure of the signal transducer, that is to say of the stated wear sensor.

The invention is based on the object of further developing a disc brake of the generic type such that the operational reliability thereof is improved with little outlay in terms of design and manufacture.

This and other objects are achieved by providing a disc brake having a brake caliper which engages over a brake disc, a brake-application device which is arranged in the brake caliper and which serves for pressing brake pads against the brake disc, and at least one adjustment spindle which is rotatably mounted, by way of a corresponding thread, in a bridge of the brake-application device. A wear adjustment device, which is positioned in the brake caliper, substantially compensates a wear-induced change in an air gap between the brake pad and the brake disc by way of an axial adjustment of the adjustment spindle. The adjustment spindle has, on its outer side, at least one axial groove, which is limited in terms of its length in the direction of the brake-application device and into which a stop, which is axially fixed with respect to the bridge, engages in a relatively displaceable manner.

A disc brake designed within the scope of the invention offers assurance that the adjustment spindle is not screwed out of the bridge for any reason.

For this purpose, the axial groove, which is formed into the outer side of the adjustment spindle and which is limited in terms of its length, forms a captive retention device in correspondence with a stop which is axially fixed with respect to the bridge and which engages into said axial groove.

This stop, which is arranged on that side of the bridge which faces away from the brake pad, may be formed by a positive-locking element, which may be provided in a variety of forms. Examples here are a fitted key or a ball, which is fixed to a suitable component of the wear adjustment device.

The component is preferably formed of a drive wheel which is held in an axially secured but rotatable manner on the brake caliper, specifically on the side of the brake caliper which faces toward the brake pad.

Here, the drive wheel is preferably a constituent part of a synchronizing device, which is used when two adjustment spindles are provided and arranged parallel to and spaced apart from one another, and which are to be adjusted uniformly, that is to say synchronously.

In this case, both adjustment spindles are equipped with in each case one drive wheel and are connected to one another a power transmission belt, for example a linked chain or a toothed belt. The drive wheels are then equipped with corresponding teeth.

Here, the stop which is in engagement with the axial groove performs not only the stop function but also the function of a driver for torque transmission, by which driver the force required for the wear adjustment is transmitted from one adjustment spindle to the other.

According to a further concept of the invention, provision is made for the length of the axial groove to be dimensioned such that the adjustment spindle can be screwed out only as far as a point at which a predefined minimum thickness of the friction lining, when the latter bears against the brake disc, is reached. Thus, in combination with a wear sensor, redundancy is achieved which significantly improves operational reliability.

It is also notable that the invention can be realized with little outlay, basically even in a cost-neutral fashion, if the stop is an integral constituent part of the synchronizing device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
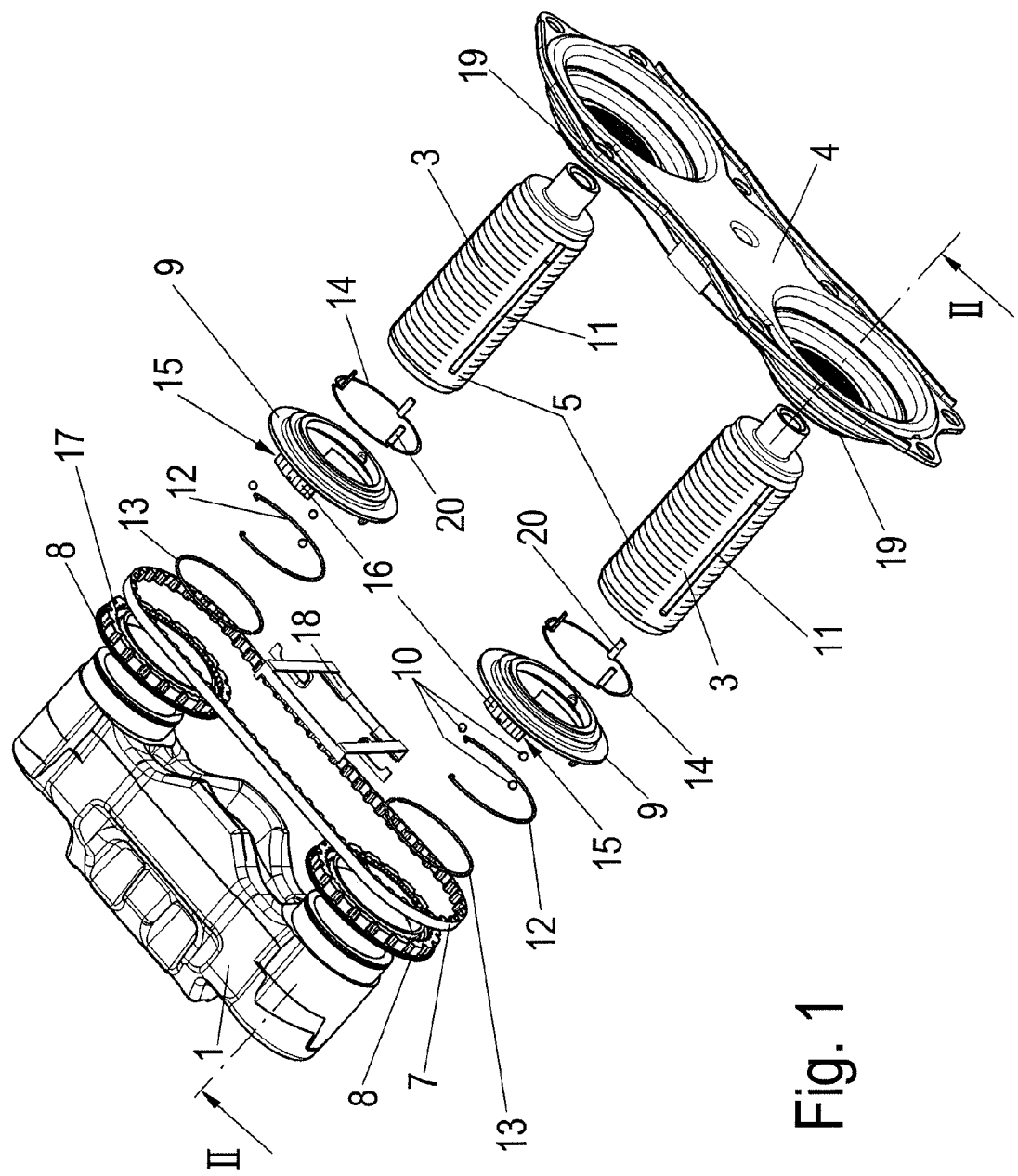
FIG. 1 shows a part of a disc brake according to an embodiment of the invention in an exploded illustration.
Figure 2:
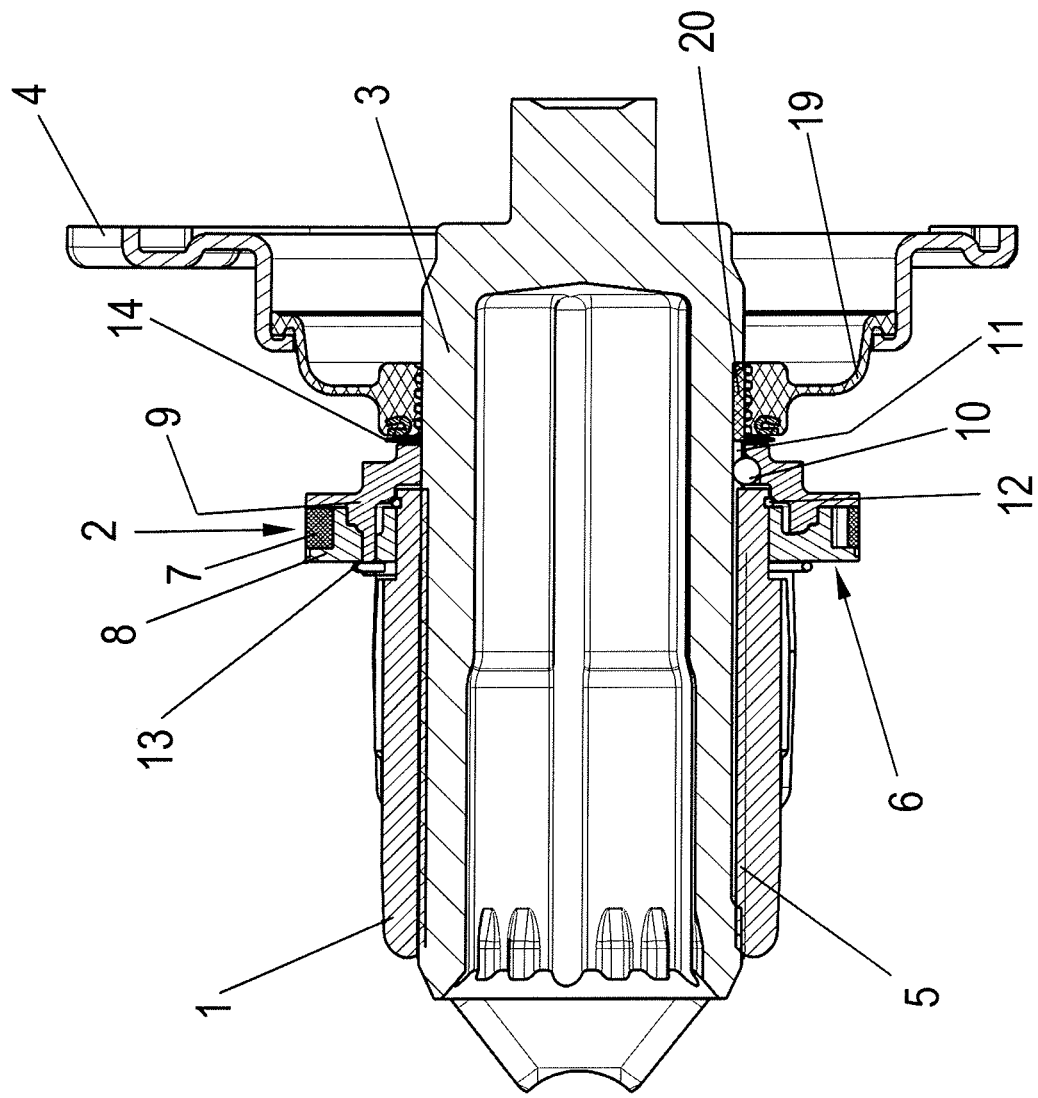
FIG. 2 shows a section through the assembled part of the disc brake along the line II-II in FIG. 1.

The figures illustrate, as a part of a brake-application device of a disc brake for a commercial vehicle, a bridge 1 which can be positioned in a brake caliper of a disc brake and by means of which brake pads can be pressed against a brake disc.

For this purpose, two adjustment spindles 3, which are arranged parallel to and spaced apart from one another, are held in the bridge 1, on one end of which adjustment spindles there are mounted thrust pieces by way of which the brake pads are pressed against the brake disc in the event of a displacement of the brake-application device.

An axial adjustment of the adjustment spindles 3 for the compensation of a wear-induced change of an air gap (clearance) between the brake pad and brake disc is possible by means of a wear adjustment device positioned in the brake caliper.

For this purpose, the adjustment spindles 3 and the associated bores of the bridge 1 are provided with intermeshing threads 5 such that, in the event of an actuation of the wear adjustment device, the adjustment spindles 3 are moved axially in the direction of the brake pad by being rotated.

To ensure a uniform adjustment of both adjustment spindles 3, a synchronizing device 2 is provided, the latter having a belt drive composed of two drive wheels 6 and a power transmission belt 7, wherein a drive wheel 6 is held in a rotationally conjoint manner on each adjustment spindle 6 and in an axially secured but rotatable manner on a bearing point of the bridge 1.

The drive wheels 6 are arranged on the side of the bridge 1 facing toward the brake pad, with a closure plate 4 which closes off the interior of the brake caliper in the leadthrough region of the adjustment spindles 3. To seal off the leadthrough region, there is connected to the closure plate 4 a bellows 19, which bears by way of a sealing surface against the adjustment spindle 3 and which, opposite the drive wheel 6, bears a seal 14 with integrally formed tongues 20.

According to the invention, each of the adjustment spindles 3 has, on its outer side, axial grooves 11, which are limited in terms of their length in the direction of the brake application device and into which there engages a stop 10 which is axially fixed with respect to the bridge.

In the example, the stop 10 is composed of a ball which is held in a freely rotatable manner in the drive wheel 6 and in the axial groove 11. In the design variant illustrated, three axial grooves 11 are provided in each adjustment spindle 3, said axial grooves being arranged offset with respect one another at an angle of 120°.

As can be very clearly seen in particular in FIG. 1, the drive wheel 6 is of two-part form and is composed of an inner wheel 9, in which the stops 10 are held, and an outer wheel 8 into which the power transmission belt 7 engages in a positively locking fashion.

The inner wheel 9 has axially projecting lugs 15 which are distributed uniformly about the circumference and which each have an external toothing 16 (FIG. 1) and which engage into an internal toothing 17 of the outer wheel 8, such that very precise setting of the adjustment spindles 3 relative to one another is possible during pre-assembly of the synchronizing device 2.

For the securing of the drive wheel 6 against axial displacement, an abutting clamping ring 13 is provided on the face side facing away from the inner wheel 9, and a clip 12 is also provided opposite, said clip being held in positively locking fashion on the bridge 1 and engaging on the drive wheel 6. The above-mentioned tongues 20 and the seal 14 rest sealingly in, in each, case one axial groove 11. The power transmission belt 7 is kept under tension by way of a tensioner 18 that bears against at least one strand of the power transmission belt.

LIST OF REFERENCE NUMERALS

1 Bridge
2 Synchronizing device
3 Adjustment spindle
4 Closure plate
5 Thread
6 Drive wheel
7 Power transmission belt
8 Outer wheel
9 Inner wheel
10 Stop
11 Axial groove
12 Clip
13 Clamping ring
14 Seal
15 Lug
16 External teeth
17 Internal teeth
18 Tensioners
19 Bellows
20 Tongue The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, comprising:
a brake caliper engageable over a brake disc;
a brake application device arranged in the brake caliper for pressing brake pads against the brake disc, the brake application device including at least one adjustment spindle rotatably mounted in a bridge via a threaded coupling;
a wear adjustment device positioned in the brake caliper for compensating a wear-induced change in an air gap between the brake pad and the brake disc via an axial adjustment of the at least one adjustment spindle, wherein
the adjustment spindle has, on an outer side, at least one axial groove, the axial groove being limited in its length in a direction of the brake-application device, and
a stop axially fixed with respect to the bridge, the stop engaging into the axial groove in a relatively displaceable manner.

2. The disc brake according to claim 1, wherein the adjustment spindle comprises multiple axial grooves arranged parallel to and spaced apart from one another.

3. The disc brake according to claim 2, wherein the axial grooves are arranged at uniform angular intervals with respect to one another.

4. The disc brake according to claim 1, wherein the stop comprises a ball or a fitted key.

5. The disc brake according to claim 4, wherein the stop is rotatable together with the adjustment spindle relative to the bridge.

6. The disc brake according to claim 1, wherein the stop is arranged on a drive wheel of a synchronizing device by which two adjustment spindles are synchronously adjustable.

7. The disc brake according to claim 1, wherein the stop is rotatable together with the adjustment spindle relative to the bridge.

8. The disc brake according to claim 1, wherein the axial groove has a length limit such that the axial groove is screwable out of the bridge only to a point at which the brake pad, in a braking position, bears with a minimum thickness of a friction lining material of the brake pad against the brake disc.

9. The disc brake according to claim 6, wherein the synchronizing device is arranged on a side of the bridge facing toward the brake disc.

10. The disc brake according to claim 6, wherein the drive wheel is mounted in a rotatable but axially secured manner on the bridge.

\* \* \* \* \*